United States Patent [19]

Spain

[11] Patent Number: 4,666,960

[45] Date of Patent: May 19, 1987

[54] FIRE RETARDANT COATING FOR COMBUSTIBLE SUBSTRATES

[76] Inventor: Raymond G. Spain, 6572 Segovia Cir., Huntington Beach, Calif. 92647

[21] Appl. No.: 755,146

[22] Filed: Jul. 15, 1985

Related U.S. Application Data

[63] Continuation-in-part of Ser. No. 450,257, Dec. 16, 1982, abandoned.

[51] Int. Cl.$^4$ .............................................. C09K 21/14
[52] U.S. Cl. .................... 523/179; 524/409; 524/425; 524/444; 524/568
[58] Field of Search ............... 523/179; 524/444, 425, 524/409, 568

[56] References Cited

U.S. PATENT DOCUMENTS

| | | | |
|---|---|---|---|
| 2,917,476 | 12/1959 | Peterson et al. | 523/179 |
| 3,865,760 | 2/1975 | Pitts et al. | 106/15 |
| 3,940,549 | 2/1976 | Whittum et al. | 428/500 |
| 4,083,789 | 4/1978 | Morgan et al. | 252/8.1 |
| 4,088,806 | 5/1978 | Sawko et al. | 523/179 |
| 4,136,215 | 1/1979 | den Otter et al. | 427/204 |
| 4,151,218 | 4/1979 | Lee | 524/339 |
| 4,228,058 | 10/1980 | Hulyalkar et al. | 524/501 |

FOREIGN PATENT DOCUMENTS

| | | | |
|---|---|---|---|
| 644119 | 7/1962 | Canada | 523/179 |
| 661812 | 4/1963 | Canada | 523/179 |

*Primary Examiner*—Lewis T. Jacobs

[57] ABSTRACT

An aqueous base coating system consisting primarily of an emulsion of an extensible halogenated polymer and water insoluble fillers which release non-combustible gases on heating is provided for exterior application to combustible substrates. On drying of the coating system, the resultant coating is no longer redispersible by water. The dried coating is highly adherent to substrates such as wood and upon sustained combustion leaves a high percentage of non-combustible residue. A substantial degree of fire resistance is provided to ignition and spread of flame by 0.1 to 0.3 pounds of dried coating per square foot of the exposed combustible substrate.

10 Claims, 2 Drawing Figures

FIRE RETARDANT COATING FOR COMBUSTIBLE SUBSTRATES

CROSS-REFERENCE TO RELATED APPLICATION

This is a continuation-in-part application of Ser. No. 450,257, filed Dec. 16, 1982, by Raymond G. Spain for "Fire Retardant Coating For Combustible Substrates", abandoned.

BACKGROUND OF THE INVENTION

1. Field of the Invention

The present invention relates to coatings for combustible building materials, and particularly roofing materials such as wooden shakes, to provide protection from ignition and the spread of combustion from external causes.

2. History of the Prior Art

Cedar shakes have found extensive use as roofing materials for housing and commercial buildings. Roofs fabricated from wooden shakes have an aesthetic appeal which with their effectiveness are attested by their extensive use for over a hundred years.

In comparison to some roofing materials which are noncombustible, such as those formed from ceramic tiles of various configurations, wooden shake roofs offer economic advantages as the roofing materials are of lower cost and their lower weight allows lower cost substructures which support the roofing materials. These economic advantages apply to new structures and to the re-roofing of existing structures.

An example of current shake roof construction practice might employ 24 inch long cedar shakes in widths of about 4 to 10 inches as applied to a roof substructure with a pitch of a 4 inch rise for a 12 inch horizontal run. Each horizontal row, or course, of shakes is secured to the substructure with nails or staples. A nominal ½ inch space is left between the shakes of an individual course, and these spaces between shakes are off-set ½ inches or more between adjacent courses. A roll of 15 to 30 pound weight per 100 square feet of roofing felt of 18 inch width is applied over the top 4 inches of the shake course and secured to the substructure. A second course of shakes is applied and secured to the substructure so that a maximum of 10 inches of the bottom of the preceding shake course is exposed. This process is repeated to form the roof. Modifications of this generalized method are employed at the eaves, hips, ridges and valleys of roofs; as well as for the covering wall surfaces.

While durable, cedar shake roofs eventually lose their effectiveness as a water barrier after many years of exposure. This loss of effectiveness with time varies widely as it can be due to a number of factors and combinations of factors. These factors include substantial erosion of the exposed surfaces, alternate swelling and contraction of the shakes due to natural wetting and drying, sunlight degradation, degradation due to atmosphere heating and oxidation, water elutriation and vaporization of natural protective components of the wood shakes and biological degradation due to mildew and other organisms. These factors may manifest themselves by splitting, warping, and greater water absorbency of the wooden shakes with an attendant loss of mechanical integrity. The roofing felt, an asphalt impregnated organic felt may become embrittled because of some of these factors and hence become more susceptible to physical degradation.

Both the shakes and the roofing felt can be physically further damaged by wind induced movement, impact by air borne objects, and by human and animal traffic on the roof.

A particular hazard of cedar shake roofs is their susceptibility to combustion. This susceptibility is heightened during periods of low atmospheric humidity and high ambient roof temperatures caused by high atmospheric air temperatures and roof heating by incident sunlight. Exposure to such atmospheric conditions reduces the water content of the shakes and makes them more prone to ignition by electrical sparks from damaged electrical power lines, lightning, and various flying burning or high temperature objects. On ignition of the roofs at local points, the spread of fire is exacerbated by winds which can cause large roof sections and even entire building roofs to be engulfed in flame in a matter of minutes. Such conflagrations, particularly where several buildings are involved, are often beyond the capabilities of fire fighting organizations which may be available.

All of these naturally occurring climatic conditions can be present during the Santa Ana winds of coastal southern California. During these periods, winds of very low humidity, such as 15% relative humidity or less, arise from the interior deserts and may prevail for several days. Public records over more than twenty years have directly linked the climatic conditions of Santa Ana winds and the use of cedar shake roofs to extensive damage and destruction by fire.

A number of products have been marketed for application to existing shake roofs with the objective of reducing the susceptibility of such roofs to extensive damage by fire.

These products have had limitations in the following areas: (1) limited effectiveness; (2) lack of performance; (3) uniformity of application; and (4) the incorporation of materials in the coating formulations which require special handling considerations.

Examples of such products which have been marketed are Flame X Shingle Safe of the Flame X Control Corp. which contains mineral spirits which is a flammable hydrocarbon, and Fire Safe AD 108 of the Am Dal Chemical Corporation. Both of these suppliers claim that their products function by absorption on application by the roof materials. A reapplication of these products to roofs is recommended by the manufacturers after five to seven years for Flame X Shingle Safe and after five years for Fire Safe AD 108. Neither manufacturer claims that their product on application significantly adds to the mechanical integrity of the exterior roof surface or would improve the roof ability to shield the interior building from water penetrating the roof.

Accordingly, it is an objective of this invention to provide an extensible dried exterior coating that enhances the mechanical integrity, life, and water sealing capabilities of the roof by virtue of the adherent properties of the coating and the mechanical and water sealing properties of the dried coating.

It is a further object of this invention to provide a water based coating composition for roofs which greatly increases the resistance of the roof from exterior ignition and spreading conflagration without requiring a substantial penetration of the coating into the wood.

It is a still further objective of this invention to provide a low cost, fire resistant roof dried coating material which on local exposure to a temperature of 1000° C. leaves an inert residue of 50 percent by weight or more after an exposure of several minutes.

BRIEF DESCRIPTION OF THE INVENTION

Coating materials in accordance with the invention are water based, machine applicable, formulations that are adherent to roofing materials and self-extinguishing. When applied in a relatively thin layer at 0.1 to 0.3 lbs/ft$^2$ rate they structurally enhance the supporting substrate, with a thin and pliable but strong and adherent layer that is largely chemically inert, water repellent, and has thermal energy absorptive properties such that a coherent and high residue layer remains after thermal exposure. Such properties are achieved at relatively low material costs and without requiring extensive application equipment or time.

The coating matrix is a flexible highly adherent noncombustible polymer which is filled several fold with particulate materials of selected sizes, forms and compositions. These fillers include two of a type which give off insulating gases, carbon dioxide and water vapor, over different, complementary, temperature ranges and leave a residue of approximately 60% of their original weight. Other inert bulking fillers increase the insulating capability and durability of the coating and have a residue of 100% of their original weight. Thus on exposure to an external heat source such as a piece of flaming debris, the coating is not combustible and insulates the combustible substrate. As the heat source persists, reactive fillers release insulating gases over a broad temperature range further contributing to the fire retardancy of the coating. At least 50% of the entire weight of the original coating remains as an insulating material of integrity. A pretreatment of water soluble monoammonium phosphate (MAP) can be used for wooden roofs as an impregnant prior to the application of the major, non-penetrating coating to provide further fire retardancy. The butt ends of cedar shakes and gaps where the shakes overlap are particular areas of benefit from this pretreatment. The waterproof coating acts as a barrier preventing removal of the MAP impregnant by rain and the like.

Coatings in accordance with the invention may be based on an aqueous emulsion of a film forming vinylidene chloride-acrylic copolymer formulated primarily with fire protective solid powders of antimony trioxide, alumina trihydrate and calcium carbonate. Based upon 100 parts by weight of the copolymer solids, the fire protective solid powders are: 5 to 10 parts by weight of antimony trioxide, 45 to 135 parts by weight of alumina trihydrate, and 55 to 165 parts by weight of calcium carbonate; with a total weight of these fire protective solids of 105 to 310 parts by weight. Silica sand in an amount of 100 to 200 parts by weight, and preferably 125 to 175 parts by weight, is added to the formulation to increase the bulk of the dried coating as a fire insensitive material and to improve coating insulation ability.

An expanded perlite powder, in the form of an inert fused sodium potassium aluminum fused silicate, may be added in an amount of 10 to 20 parts by weight, and preferably about 15 parts by weight, to substantially increase the bulk and insulating ability of the dried coating. This additional bulking agent is preferably employed wherein other major fillers are of particle sizes greater than a median size of 40 microns. Further coating formulation materials, each comprising less than 3 parts by weight, may include: coloring pigments, modified cellulose thickening agents to mitigate settling of dispersed solids, and emulsion stabilizing salt and a surfactant to aid in particle wetting and dispersion and to enhance emulsion stability, an antimicrobial, a base such as sodium hydroxide for pH control, a defoaming agent, and a polymer-filler coupling agent. In addition to the water present in the copolymer emulsion, water is added to the formulation to obtain a solids weight content of 60 to 85 percent. The sizes of the filler particles are controlled and the sequence of addition of materials, other than bulking fillers added at the application site, is adapted such that foaming and consequent mixing difficulties are avoided. Basically the sequence used followed the form: (1) water and acrylic latex, (2) minor additives including anti-foam agent, (3) reactive fillers, (4) coupling agent, and (5) concentrated thickener solutions. The viscosity of the coating mixture prior to the addition of silica sand, Microperl GT-25 and additional water was 6000 centipoise. This facilitated mixing of additional materials at the application site and also prevents settling and caking of solid materials in the primary coating mixture when standing for a time.

On application of the coating formulation to the exterior of a wooden roof in an amount resultant in 0.1 to 0.3 pounds per square foot, a tough adherent pliable water resistant coating forms on evaporation of the water and absorption of the water from the coating by the wooden roof.

The coating was also found to be effective in imparting fire retardancy to asphalt based roofing materials, with lesser amounts of coating required than for wooden roofing. A coating areal density of 0.12 pounds per square foot was about equivalent to 0.20 pounds per square foot with wooden roofing. These coatings were also found to benefit the mechanical integrity of and the water sealing ability of asphalt roofing materials.

Economical roof coating procedures are desired, and airless spraying can be employed to apply the coating to wooden and asphalt roofing. Smooth surfaces, such as found for some asphalt roofing, can also be coated by the use of: brushes, rollers, swabs, and squeegees.

This resultant coating affords a greatly increased resistance to ignition of wooden roofs by exterior causes and to the spread of combustion. Further, the dried coating, via its adhesion and inherent toughness together with the coating thickness increases the integrity of the roofs. Individual wooden shakes which could easily be moved by hand prior to coating are bound by the dried coating to form a mechanically coherent structure, and small cracks in the shakes are sealed by the coating.

BRIEF DESCRIPTION OF THE DRAWINGS

A better understanding of the invention may be had by reference to the following description, taken in conjunction with the accompanying drawing, in which.

DETAILED DESCRIPTION OF THE INVENTION

Figure 1:
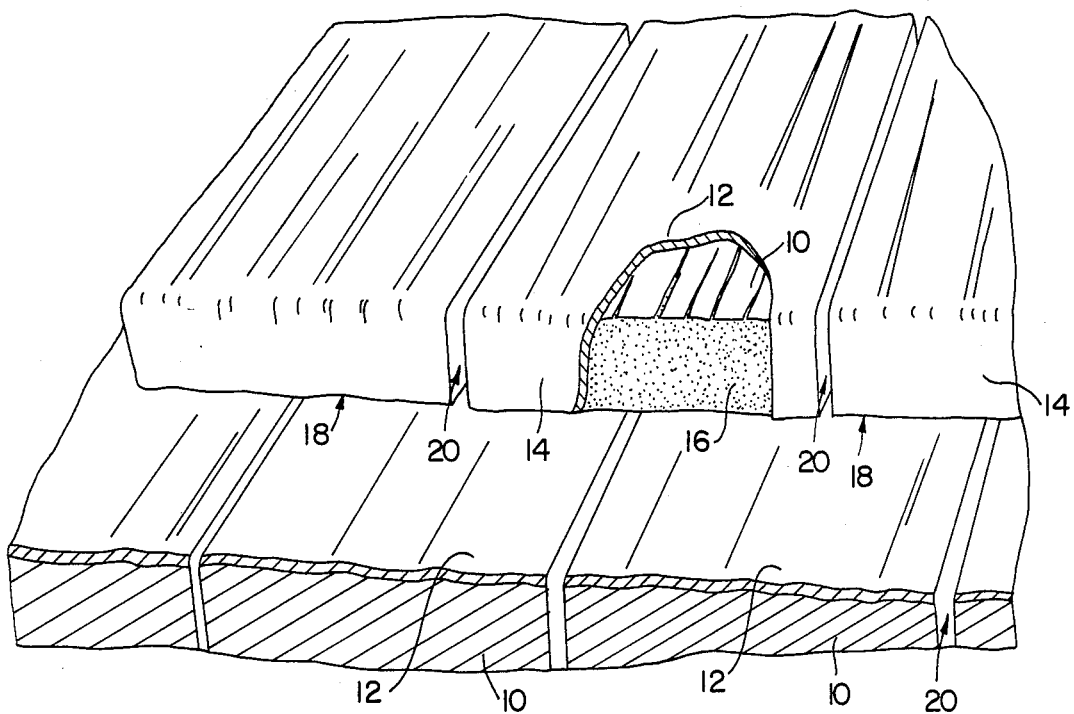
FIG. 1 is a perspective view of a portion of a shingle roof which treatments in accordance with the invention have been applied.

Coatings in accordance with the invention to provide fire protection via:

1. A halogenated polymer matrix which will not sustain combustion forms a structural unifier having adherent and elastomeric properties.

2. Endothermic additives are dispersed in the matrix to provide thermally related release of non-combustible gases such as water vapor and carbon dioxide over a broad temperature span, particularly up to about 900° C. Preferably the system is such that water vapor is exothermically evolved below about 400° C. while carbon dioxide is exothermically evolved above about 400° C., and each gas provides an insulating environment.

3. The coating is applied with an areal density sufficient to sustain the fire protection of the substrate for several minutes on exposure to external ignition sources such as flaming debris. It includes inert bulking particulates which provide desirable structural, surface and appearance properties, while also being of low cost.

4. The coating unifies and protects an aged or fragile base and adds water proofing but also retains a residue of 50% or more of the initial coating weight after exposure to temperature of 1000° C. or higher to provide an insulation and ignition barrier that retains a useful degree of physical integrity.

5. The coating composition is essentially unchanged after prolonged exposure to sunlight, intermittent rain, and high ambient air temperatures.

6. Machine application techniques, such as airless spraying are used because of the viscosity and flowability of the mix and the water base.

As the coating composition is essentially unaffected by liquid water and also has a low moisture vapor transmission rate, the coating may be used to prevent the loss of water soluble flame retardants applied to absorptive substrates. Examples of such water soluble flame retardants are mono and diammonium phosphates. These may be applied as water solutions to substrates such as wood roofs prior to the coating composition, or as a part of the water phase of the coating composition as it is applied to the substrate. In the latter case, a portion of the water soluble flame retardant is absorbed by the substrate. On drying of the coating composition to its water resistant form, a barrier is thus formed to the subsequent removal of the soluble flame retardant by water applied to the exposed exterior of the dried coating composition. A natural form of water application would be rain.

Fire retardant coatings in accordance with the invention employ an aqueous latex of a film forming elastomeric polymer with a halogen content of at least 40% by weight. The amounts of other constituents of the coating are based on 100 parts by weight of the solids of the polymer latex. Other major coating constituents which contribute to the fire retardant properties of the dried coating are particulate solids, which together form about 215 to 530 parts by weight, are antimony trioxide, alumina trihydrate, calcium carbonate, fine silica sand, and expanded perlite powder.

The halogenated elastomeric polymer employed as a constituent of the coating is chosen from the class of formulations known as synthetic polymer latices This component forms the continuum of the dried coating, and in the as-formulated state must be capable of forming an integral film on drying which exhibits a high degree of adhesion to substrates such as cedar shakes. A latex of vinylidene chloride-acrylic polymer sold by B. F. Goodrich Company has been found to be especially advantageous. The polymer of this latex contains about 54 percent chloride by weight. Dried cast films of the unfilled polymer exhibit an initial tensile strength of about 700 pounds per square inch (psi) and an elongation of over 500%. Due to an inherent cross-linking or vulcanization capability, 5 minute exposures of the dried films at temperatures through the range of 107° to 135° C. result in an increase of tensile strength to about 1200 psi and a modest decrease in elongation to about 400%. The glass transition temperature of such films is about 7° C. The flame retardancy of halogenated polymers is enhanced by the incorporation of particulate antimony trioxide. Alumina trihydrate on heating loses about 35 percent by weight of its chemically combined water by endothermic reaction, primarily in the temperature range of about 290° to 360° C. Natural ground calcium carbonate loses about 44 percent by weight on heating to about 900° C. via an endothermic reaction.

Fine silica sand, free of organic debris, is employed to provide abrasion resistance to the dried coating, contribute to the bulk of the coating inert to combustion as a barrier to the supply of oxygen to the combustible substrate, and to form an internal visual gauge as to the amount of coating applied to roofs as by airless spraying. Of the minor coating formulation components, cellulose based aqueous thickening agents are utilized to prevent substantial flow of the coating when initially applied to pitched roofs such as those at an angle of 20 degrees with the horizontal. A mixture of Methocel J12MS and Methocel A4C sold by Dow Chemical Co. have been found especially advantageous. Other minor components such as pigments, surfactant system, and a latex preservative are identified subsequently.

While a particular coating matrix polymer is described in the following examples, other polymer systems, mixtures of polymer systems, and polymer systems with non-fugitive plasticizers could be employed which meet the criteria presented.

EXAMPLE 1

A coating formulation was prepared in accordance with the following Table I with mixing provided by a mechanical propeller type stirrer. Generally accepted mixing practice was followed to insure that a uniform dispersion of the materials was obtained, and particularly that solution of the thickening agents was obtained, without the formation of gelled particles. As a matter of convenience, the fine silica sand was not added at this point, but at a later point prior to application of the coating. With all solid materials combined except the sand, the pH of the agitation mixture was about 6.0.

The solids content of the formulation without sand is about 70.1 percent by weight. In this form the coating is well adapted for the coating of vents, flashing, and braces found on roof structures to provide an aesthetically pleasing appearance.

TABLE I

| Component | Parts by Weight | Parts Solids by Weight |
|---|---|---|
| Vinylidene chloride-acrylic copolymer latex (54.4% solids by weight)[a] | 183.8 | 100.0 |
| Hydrated alumina[b] | 91.0 | 91.0 |
| Calcium carbonate[c] | 109.0 | 109.0 |
| Antimony trioxide[d] | 7.5 | 7.5 |
| Sodium pyrophosphate decahydrate | 1.0 | 1.0 |
| Pluronic F 68[e] | 0.5 | 0.5 |
| Methocel J12MS[f] | 0.5 | 0.5 |
| Methocel A4C[f] | 0.5 | 0.5 |
| Dowacil 75[g] | 0.1 | 0.1 |
| Pigment system[h] | 4.4 | 2.2 |

TABLE I-continued

| Component | Parts by Weight | Parts Solids by Weight |
|---|---|---|
| Fine silica sand[i] | 150.0 | 150.0 |
| Water | 43.8 | 0 |
| 10% Sodium hydroxide in water | 4.0 | 0.4 |
| | 596.1 | 462.7 |

% Solids = 77.6% by weight
% Solids (without fine silica sand) = 70.1% by weight a. Geon 660X1 is a vinylidene chloride-acrylic copolymer latex sold by B. F. Goodrich Company. The latex readily forms films on evaporation of the water of the latex. The polymer has a chlorine content of about 54% by weight.

b. Hydrated Alumina C-31 is sold by Aluminum Company of America. By specification a maximum of 15% by weight of this powder is retained on a 200 mesh screen.

c. Calcium carbonate powder prepared from ground limestone with a purity of 97% by weight of calcium carbonate is sold as Vicron 45-3 by Pfizer Minerals, Pigments and Metals Division. Vicron 45-3 has a maximum particle size of about 13 microns.

d. Fire Shield Antimony Oxide H Grade is sold by PPG Industries, Inc. This product has an average particle size of 1.0 to 1.8 microns.

e. Pluronic F 68 is a non-ionic surfactant sold by BSAF-Wayandotte Chemical Corp.

f. Methocel A4C and Methocel J12MS are chemically modified cellulose based water thickening agents sold by Dow Chemical Company.

g. Dowacil 75 Preservative is sold by Dow Chemical Company as a protective agent against spoilage for various products including latices. It is a powder containing 67.5% by weight of the active ingredient 1-(3-chloroallyl)-3,5,7-triaza-1-azoniaadamantane chloride.

h. Aurasperse aqueous pigment dispersions are sold by Harshaw Chemical Co. A 10:1 by weight ratio of Aurasperse W-3247 Burnt Umber (about 51% by weight) and Aurasperse W-7017 Lamp-black (about 53% solids by weight) were utilized.

i. Fine silica sand, free of organic debris and large foreign particles was used. The maximum dimension of individual sand particles was about 300 microns.

The fine sand is easily combined with the formed coating formulation by simple stirring.

In a test of the fire protection ability of the coating containing 150 parts by weight of sand, the upper 12 inch portion of shake specimens measuring about 24×3×⅜ inches were coated with the formulation at an areal density of 0.258 pounds per square foot on all four surfaces. This was equivalent to a dried coating weight of about 0.20 pounds per square foot. On drying, the coated shake specimens together with uncoated control shake specimens of the same dimensions were conditioned in a sheltered location in ambient air for two weeks to allow for equilibration of the moisture content of the coated and uncoated control specimens.

Coated specimens with the coated portion uppermost, and separated uncoated control specimens were hung vertically by means of steel wires in still air and the bottom edges of the specimens ignited. Combustion of the uncoated specimens proceeded vigorously up the entire length of the specimen and totally consumed the specimens leaving only a shrunken portion of friable ash. In contrast, the combustion of the coated specimens proceeded vigorously upwards until the flames reached the coated portion and then self-extinguished. Only about a half inch or less of the coated portion was deteriorated to any significant degree, while the remaining 11½ inches was unaffected as to mechanical integrity and the coating appeared unchanged.

EXAMPLE 2

Thermal gravimetric analyses of the coating were conducted to experimentally verify the temperature range of release of the insulating gases and the amount of residue remaining after exposure at 1000° C. for a significant period of time. Results agreed well with predicted values.

A sample of dried coating from the formulation of Example 1 without the addition of 150 parts by weight of fine silica sand was utilized as for thermogravimetric analysis (TGA). As the sample size was small at 27.4 milligrams, the dried film without sand was used to insure that the sample was uniform and of the composition presented previously. The analysis was conducted using a DuPont Thermal Analyzer in an air atmosphere with a heating rate of 10° C. per minute. Results and calculations are presented in Table II:

TABLE II

| Temperature, 0° C. | Measured Weight Retention, % | Calculated Weight Retention With 150 Parts By Weight Of Fine Silica Sand, % |
|---|---|---|
| 250 | 85 | 90 |
| 300 | 79 | 86 |
| 400 | 70 | 80 |
| 500 | 58 | 72 |
| 600 | 53 | 68 |
| 700 | 49 | 65 |
| 800 | 48 | 65 |
| 900 | 47 | 64 |
| 1000 | 45 | 63 |

Handbook values give a range of about 300° to 360° C. for the decomposition of hydrated alumina (aluminum hydroxide) to alumina and 34.6% water, and the decomposition of calcium carbonate to calcium oxide and 44% carbon dioxide is given as about 900° C.

As a verification of the calculated TGA weight loss for the conditioned coating containing 150 parts by weight of fine silica sand, a much larger 5 gram sample of pieces of the conditioned coating with sand was heated in air in a muffle furnace to 1000° C. and held at 1000° C. for about 20 minutes. The residue was an off-white, friable solid which maintained the shape of the original coating pieces. No carbonaceous residue was evident. The measured weight retention was 61 percent by weight and was in good agreement with the calculated value of the Table of 63% by weight.

EXAMPLE 3

In order to further investigate the primary thermally active constituents of the coating, dried films of the 4 formulations of Table III were prepared and characterized by (1) TGA in air at a heating rate of 20° C. per minute, and (2) by heating in air in a muffle furnace at about 5° C. per minute with a 20 minute residence at 400° C. prior to cooling and weighing, with subsequent further heating at 5° C. per minute from 400° C. to 1000° C. with a 20 minute residence at 1000° C. prior to weighing. Samples employed in TGA were of masses of about 25 milligrams, while those employed in the muffle furnace evaluations were of masses of about 2 grams.

TGA data for Formulation 1, which does not contain hydrated alumina or calcium carbonate, exhibit almost complete volatilization of the material at about 700° C. In contrast, Formulation 4 which contains all thermally active ingredients, exhibits a TGA weight retention of 53% at 750° C.

The muffle furnace evaluations at 400° C. comparing base Formulation 1 and Formulation 2 show that the weight retention of Formulation 2 can be approximated by combining the weight retention of Formulation 1 as 30% of 108 parts by weight, or 32 parts, with the literature weight retention of alumina trihydrate of Formulation 2 as 65% of 91 parts, or 59 parts, for a total of 46% weight retention. This calculated value of 46% is in reasonable agreement with the measured value of 48% weight retention for Formulation 2.

Similarly, a comparison of Formulation 1 and Formulation 3 at 400° C. indicate that the weight retention of Formulation 1 or 32 parts with the total amount of calcium carbonate or 109 parts yields a calculated value of 65%, which is the same as the measured value.

The muffle furnace evaluations at 1000° C. can be calculated to yield weight retentions for Formulations 2, 3 and 4 of 30%, 31%, and 41%. These are in reasonable agreement with the measured values of 32%, 34%, and 41%.

At a fixed level of the chlorine containing polymer system, which is an expensive major coating ingredient, the addition of hydrated alumina is of benefit in that a substantial amount of water vapor is exothermically evolved below 400° C. where ignition of substrate per se would occur. Examination of the data of Table III for Formulations 2, 3 and 4 illustrates that exothermic decomposition of calcium carbonate to evolve carbon dioxide occurs substantially above 400° C. Thus the hydrated alumina and calcium carbonate provide for the evolution of insulating gases over a broader temperature range than either material alone.

Addition of 150 parts by weight of fine silica sand as an inert extender to Formulation 4 would result in a calculated weight retention of 60% in the muffle furnace evaluation at 1000° C.

about 0.2 pounds (or about 0.14 pounds per square foot of dried coating) per square foot between the 1"×1" faces of two pieces of cedar board of 5/16" thickness. The sand was omitted so that good contact could be achieved during drying of the formulation. A pressure to insure contact of about 0.1 pounds per square foot was maintained for two days as the formulation dried at ambient conditions. The grain of the wood was parallel to the coating interlayer.

After about two weeks, the specimens were subjected to tensile forces normal to the bonding coating at a linear rate of 0.05 inches per minute until failure. Examination of the fracture surfaces showed that more than half of the failures were in the wood rather than at the adhesive surfaces, indicating that the adhesion of the coating was at least as strong as the wood normal to the grain.

The formulation of Example 1 with the fine silica, was applied to commercial 0.3 pound per square foot asphalt roofing felt in an amount equivalent to 0.2 pounds per square foot of dried coating and allowed to dry for about a week at ambient conditions. The coated felt could be repeatedly flexed about a 0.5 inch diameter mandrel without any evidence of cracking or separation of the coating from the felt.

Cast sheets of the formulation of Example 1, with fine silica sand, were prepared with dried sheet thicknesses in the range of 0.037 to 0.047 inches. After about one week, 0.75 inch wide strips were cut to form tensile specimens and tested in tension with a gauge length of 1.0 inches and a cross-head tensile machine at a rate of 0.2 inches per minute. An average tensile strength of 200 pounds per square inch and an average elongation of 13 percent at failure resulted. Tensile failures initiated at the specimen edges and may have resulted from flaws induced on cutting during preparation of the samples.

EXAMPLE 5

As an extension of the formulation presented in Table I of Example 1, alterations were employed to: improve the formulation mixing efficiency and to improve the durability and fire retardant efficiency after application.

TABLE III

| Formulation | 1 pbw* | 2 pbw* | 3 pbw* | 4 pbw* |
|---|---|---|---|---|
| Geon 660X1 Solids | 100.0 | 100.0 | 100.0 | 100.0 |
| Powdered Hydrated Alumina | — | 91.0 | — | 91.0 |
| Powdered Calcium Carbonate | — | — | 109.0 | 109.0 |
| Powdered Antimony Trioxide | 7.5 | 7.5 | 7.5 | 7.5 |
| Methocel J12MS | 0.5 | 0.5 | 0.5 | 0.5 |
| | 108.0 | 199.0 | 217.0 | 308.0 |

| Formulation | Start of Wt. Loss | Wt. Retention, %: TGA | | | | | | | |
|---|---|---|---|---|---|---|---|---|---|
| | | 250° C. | 300° C. | 400° C. | 500° C. | 600° C. | 700° C. | 750° C. | 1000° C. |
| 1 | 205° C. | 60 | 45 | 32 | 22 | 9 | 2 | 0.5 | |
| 4 | 220° C. | 89 | 82 | 69 | 60 | 56 | 54 | 53 | |

| | Wt. Retention, %: Muffle Furnace | |
|---|---|---|
| 1 | 30 | 0:5 |
| 2 | 48 | 32 |
| 3 | 65 | 34 |
| 4 | 65 | 43 |

*Parts by weight

EXAMPLE 4

The adhesive and strength properties of the coating formulation of Example 1 were verified by a number of tests.

A series of specimens were prepared by applying a coating of the formulation without fine silica sand of This formulation is shown in Table IV.

Explanatory notes of materials which are not presented in Table I or of materials which are used in an altered form, such as larger particle sizes, are given for Table IV.

The mixing sequence is in the order shown in Table IV. Specifically, this was: (1) water and the acrylic latex, (2) minor additives including the anti-foam agent, (3) the reactive fillers, (4) the coupling agent, and (5) the concentrated thickener solutions. This sequence almost totally eliminates foam formation on mixing as was previously encountered and hence does not require long periods of standing for the foam to subside and constitutes a major practical advantage in manufacture.

In this example, the particle sizes of the three major fillers were substantially increased, and large particle size expanded perlite filler, Microperl GT-25 was added. The smallest median particle size of the three major fillers of Table I is 13 microns for calcium carbonate as Vicron 45-3. In contrast, the calcium carbonate of Table IV has a median particle size of 40 microns. Hydrated alumina and silica sand of Table IV are also of substantially larger particle sizes at 75 and 350 microns than those of Table I at 45 and 200 microns, and the Microperl GT-25 has a median particle size of 110 microns.

These larger particle sizes with attendant significantly lower surface areas, the new use of an antifoam agent, and the mixing sequence all promote more rapid mixing with little undesirable foaming in the first stage of formulation.

Mixing of the pre-weighed #30 silica sand, Microperl GT-25 and additional water was accomplished on successful application of the modified coating to a shake roof house using a Cyclone T-100 airless spray unit with an integral mixing capability. This supports the feasibility of this portion of coating mixing as an on-site operation. The viscosity of the coating mixture prior to the addition of the silica sand, Microperl GT-25 and additional water was 6000 centipoises. This viscosity facilitated the ease of mixing of the additional materials at the site of application. This viscosity also serves to prevent settling and caking of solid materials in the primary coating mixture on standing prior to site delivery for final mixing and application.

The use of the low density Microperl GT-25 increases the average thickness of the dried coating by about 15%, and thus contributes to the insulating value of the coating even when subjected to high temperatures as it is unaffected to above 2000° F. This increase in the thickness of about 15% at the same areal coating density of nominally 0.20 pounds per square foot also improves the ability of the coating to improve sealing of imperfections in roofs against penetration by water.

Figure 2:
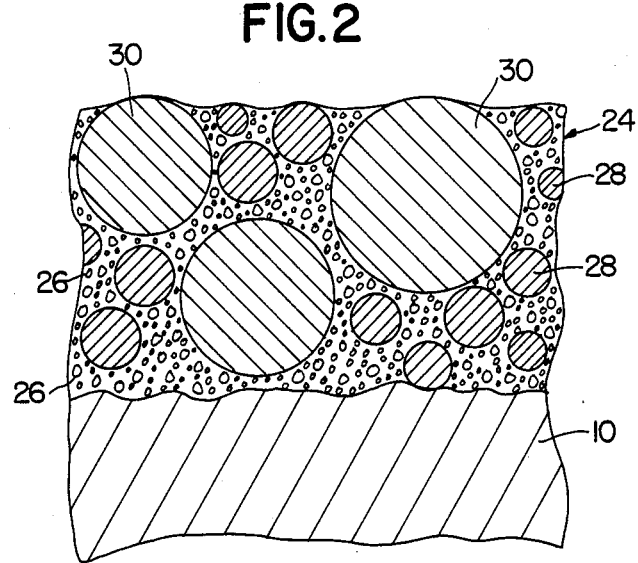
FIG. 2 is a substantially enlarged cross-sectional view of a surface layer in accordance with the invention, as applied to the surface of a wood roofing shake.

While expanded perlite particles, such as Microperl GT-25 are mechanically crushed rather easily, the use of substantial amounts of larger particle sand in conjunction with the perlite prevents crushing on mixing at the application site and by foot traffic or other sources of mechanical loads after the coating has been applied. The protective nature of the larger dense silica sand particles in preventing crushing of the hollow perlite particles is depicted in FIG. 2. The median size of the silica sand particles is 350 microns while that of the perlite particle is 110 microns.

In FIG. 2, an interior section of an average 0.018" surface layer 12 applied to a wood shake 10 includes a matrix 24 primarily of latex polymer as previously described. A mix of gas evolving fillers of micron particle size is distributed through the matrix 24 and appears as comparatively minute spheroids 26. The perlite particles 28 of approximately 110 micron size are also distributed throughout the matrix 24 and are substantially larger. The perlite particles 28 are relatively brittle and crushable by themselves, but are well cushioned in the matrix 24 and buttressed by the larger (350 micron) and more populous particles 30 of silica sand. The layer 12 has sufficient flowability to engage the irregular surface of the shake 10, firmly adhering to the wood fibers at the interface and providing an augmenting seal against water penetration. The upper surface has a somewhat sandpaper-like texture, thus avoiding an unnatural shininess as well as dangerous surface slipperiness.

The use of the coupling agent gamma amino-propyl-triethoxysilane (A-1100) improves the particulate filler-acrylic polymer bond and is intended to promote long term coating life at atmospheric exposure conditions. Short term experiments indicate a reduced water absorption of the dry coating containing the A-1100.

TABLE IV

| Component | Parts by Weight | Parts Solids by Weight |
|---|---|---|
| Vinylidene chloride-acrylic copolymer (54.0% solids) | 100.0 | 100.0 |
| Water (total) | 137.8 | — |
| Pluronic F68 | 0.5 | 0.5 |
| Sodium pyrophosphate decahydrate | 1.0 | 1.0 |
| Dowacil 75 | 0.1 | 0.1 |
| Pigment system (50%) | 3.0 | 3.0 |
| DB-110A Antifoam Emulsion (10%)$^j$ | 0.125 | 0.0125 |
| Calcium carbonate$^k$ | 109.0 | 109.0 |
| Hydrated alumina$^l$ | 91.0 | 91.0 |
| Antimony trioxide | 7.5 | 7.5 |
| A-1100 Coupling Agent$^m$ | 0.4 | 0.4 |
| Methocel 4AC (4%) | 0.5 | 0.5 |
| Methocel J12MS (2%) | 0.5 | 0.5 |
| | 451.4 | 313.5 |
| Added prior to coating applications | | |
| Water | 28.5 | — |
| #30 Crystal Silica Sand$^n$ | 150.0 | 150.0 |
| Microperl GT-25$^o$ | 15.0 | 15.0 |
| | 644.9 | 478.5 |
| Total Solids | | 74.2% |

Designations not given for Table I follow:

j. DB-110A Antifoam is sold by Dow Corning Corporation. It has an active weight concentration of about 10%.

k. Marblewhite 80 is calcium carbonate powder sold by Pfizer Inc. It has a median particle size of about 40 microns.

l. Hydrated Alumina C-31 Coarse is sold by Aluminum Company of America. It has a median particle size of about (75 microns.

m. A-1100 Coupling Agent is a liquid coupling agent sold by Union Carbide Corporation. A-1100 is gamma-aminopropyl triethoxysilane.

n. #30 Crystal Silica Sand is sold by Ottawa Silica Company. It has a median particle size of about 350 microns.

o. Microperl GT-25 is powdered expanded perlite sold by Grefco Minerals. It has a median particle size of about 110 microns and an apparent specific gravity of 0.33.

EXAMPLE 6

Coating durability as applied to wooden roofing has been a subject of continuing assessment.

A 40 inch by 52 inch test deck as described in ASTM E108-78 was covered with #1 cedar shingle boards in the prescribed method. This exposed surface of the shingle boards was coated with the formulation as described in Table I of Example 1 at a level of 0.20 pounds per square foot in September 1982 and exposed outdoors unprotected from the weather in Huntington Beach, Calif., until November 1984. The exposure time was thus in excess of two years. No deterioration of the coating was evident.

At that time, the test deck was desired for a trial with a different type of roofing so that it was necessary to remove the cedar shingle boards. Normally, uncoated shingle boards could be readily removed with a pry as the exposed butt edge of the shingle is not nailed to the deck and some warpage along the butt ends of the shingles occurs on exposure of a few seasons facilitating insertion of a pry and shingle removal.

However, in this case of coated shingle board roofing, the butt edges of individual shingles were firmly adhered to the faces of the underlying shingle boards. Removal of the shingle boards required the use of a hammer and chisel to break the coating bond along the shingle butt end so that a pry could be used to dislodge the shingle boards from the test deck.

This practical case illustrates the improvement in roofing integrity provided by the coating and the preservation of that integrity over the two year outdoor exposure of the test deck. At that point, no signs of coating or bonding failure were evident.

EXAMPLE 7

The exposed thick butt end of cedar shakes in the courses constituting roofs and the frequency of a gap between these butt ends and the next underlying shakes present a problem as the exposed butts can become very porous and the inner portion of the gaps may not be totally covered by spray application of the non-penetrating coating. Thus on exposure to a combustion source such as flying burning debris, flaming combustion of the roof is prevented, but a flameless afterglow may persist. Such an afterglow can cause extensive damage. An inexpensive aqueous pretreatment with a penetrating afterglow suppressant is used for the purpose of minimizing or eliminating such effects.

The use of monoammonium phosphate (MAP) as a pretreatment for wooden roofs prior to application of the coating of this concept was briefly discussed previously. Tests were run to determine the effects of MAP applied as a 20% concentration in water, and to determine practical methods of application to achieve benefit from MAP application in an economical fashion.

Trials were conducted with 17 year old untreated cedar shakes which had been removed from a house being re-roofed. The 20% solution of MAP was applied to the shakes in amounts equi-valent to 0.01, 0.02, and 0.03 pounds per square foot of MAP. On simple spraying, the shakes readily absorbed the solution amounts equivalent to 0.01 and 0.02 pounds per square foot, while some run off was encountered at the 0.03 pounds per square foot level. This necessitated some re-spraying.

On drying, some MAP crystals were evident on the 0.03 pounds per square foot specimen and this was judged as undesirable. No crystals were evident at the lower levels employed.

Flame from a propane torch was directed at the center of the surfaces of unimpregnated control shakes and at the MAP impregnated shakes until combustion of the shake was initiated. This required progressively longer times as the MAP level increased, and covered a range of times at the conditions employed from roughly 30 to 120 seconds. The torch was then removed and the specimens laid flat with flame exposed sides up This caused all flames to be extinguished, but in a gentle air draft of about 2 to 4 miles per hour an afterglow persisted for the specimens which were not impregnated for several minutes and spread substantially in the down air draft direction. This was greatly mitigated for the 0.01 pounds per square foot MAP specimen, and was essentially non-existent for the 0.02 and 0.03 pounds per square foot specimens. The spread of the afterglow is deleterious and afterglow presents an opportunity for the restart of massive combustion of actual roofs.

As a result of the application trials, fire test results, and considerations of economy, a MAP coating level of 0.02 pounds per square foot was selected as practical.

The use of a MAP prespray readily allows the application of this fire retardant and afterglow suppressant into the cavities formed at the butt ends of wooden shakes and shingles on roofs as well as into the exposed butt ends themselves via the high absorption of the solution along the grain of the wood. As seen in FIG. 1, the fire sensitive cavities thus shield the MAP by both the geometries of the overlapping wooden shakes or shingles as well as by the protective nature of the subsequent thick water resistant coating.

In FIG. 1, a simplified and generalized view of a portion of a wood shake or shingle roof, individual shakes 10 are seen as they appear when coated with adherent surface layers 12 in accordance with the invention. Using an airless sprayer (not shown), the surface layers 12 cover the broad upper surface of each shake 10 with an essentially uniform average thickness of about 0.018" and a density of about 0.2 pounds per square foot.

The coating also forms an edge layer 14 on the end faces 16 of the shakes 10, although it is generally not as uniform as the spray applied coating on the broad upper surfaces of the shake. Similarly, the coating is also not as uniform at recesses 18 under the shake ends and in openings 20 between the shakes. While these local nonuniformities could be overcome by the application of much more coating than an average of 0.20 pounds per square foot, this becomes uneconomic for most applications in terms of the added material required and in the added time consumed in such special spray application. Consequently, it is preferred to pre-spray an impregnating fire retardant and afterglow suppressant such as a solution of monoammonium phosphate at an appropriate low angle. Thus this spray of very low viscosity impregnant is readily absorbed by the end faces 16 of the edge grain of the shakes and also readily intrudes into the recesses 18 and openings 20 between the shakes 10. This pre-spraying is economic in terms of materials and application effort. Subsequent application of the non-penetrating coating to the shake roof structure, such as at surface layers 12 and edge layers 14, provides for the retention of the pre-spray impregnant.

Application of the thick coating of Table IV at 0.20 pounds per square foot immediately after application of the solution equivalent to 0.02 pounds per square foot of MAP was accomplished with no difficulty.

Fire tests of resultant presprayed and coated 17 year old cedar shakes were conducted as described in Example 1 with equally good or better results.

EXAMPLE 8

Asphalt impregnated roofing materials when locally ignited can cause a violently progressive combustion due to the enhancement of the combustibility of the hydrocarbons from the effects of higher temperatures. Further, on heating, the asphalt materials develop a very low viscosity and on sloped surfaces can form flaming rivulets flowing so as to further rapidly spread combustion. The coating was successfully applied to asphalt roofing materials as an economically attractive method to provide fire retardancy and to further benefit such roofing in its primary role of providing protection from atmospheric water by extending the useful life of the roofing.

Tests were pursued to assess the performance of the coating on asphalt based roofing materials.

As a test of durability of the coating, the formulation of Table I of Example 1 was applied with an airless spray to a manufacturer's display board of about $2 \times 1.5$ feet comprised of Johns Manville "Seal-O-Matic" 3 tab fiberglass asphalt shingles. The coating areal density after drying was about 0.12 pounds per square foot. After two years of outdoor exposure in southern California, the shingles remain adhered to an integral unit with no signs of coating deterioration.

As adhesion of the coating to asphalt impregnated felt had been demonstrated as in Example 4, further coating and fire testing was conducted with No. 30 Asphalt Impregnated Organic Felt of Tarco, Inc., and Elk Roofing Products asphalt shingles.

In preliminary tests with both the asphalt felt and the asphalt shingles, a dried weight of about 0.12 pounds per square foot of the coating of Table IV of Example 5 was found to be readily applied to a uniform appearance and to be capable of bridging defects such as small cracks or holes from nails or staples used in roof application. Other preliminary testing indicated a substantial degree of effectiveness as to fire retardancy; hence the level of 0.12 pounds per square foot was fixed for further sample preparation and fire testing as well as by considerations of desirable economics.

In tests with No. 30 asphalt felt, three types of specimens were prepared as 2 inch wide strips. The specimens were: (a) the as-received asphalt felt, (b) the felt coated with 0.12 pounds per square foot of the coating of Table IV, and (c) the felt coated with 0.025 pounds per square foot of the vinylidene chloride copolymer without the additional 0.095 pounds per square foot of other components of the coating. The (B) and (C) specimens were uncoated for a short length at the bottom of the strips to allow for ignition by a propane torch.

The three types of specimens were placed at a 45° angle on a half inch plywood substrate and the bottom uncoated portion of the strips ignited with a propane torch which was then removed. Dense, sooty flames consumed the uncoated felt strip (A) leaving only a crisp, deformed residue. The polymer coated strip (B) appeared to burn somewhat more slowly than strip (A), but end results were similar with virtually complete destruction of the strip. In contrast, the flame at the bottom of the uncoated portion of strip (C) was extinguished on reaching the coated portion.

It was concluded from these tests that the fire retardancy provided by the coating is not due to the non-combustible polymer portion of the coating per se, but rather to the interaction of the various components of the coating.

Another series of trials employed specimens coated employing vertical masks so that on a single specimen of No. 30 asphalt felt or Elk Roofing Products asphalt shingles a vertical division of 0.12 pounds per square foot of coated and uncoated areas resulted.

Specimens with the vertical division of coated and uncoated portions were then placed on a plywood substrate at angles of about 20° to 80° with the horizontal and subjected to the flame of a propane torch. The flame was directed at the line of intersection of coated and uncoated areas in some trials, and at only the coated or uncoated areas of specimens in other trials.

Flames from the propane torch were directed toward the specimen surfaces with the burner directed flame at an angle of about 45° to the specimen. Thus a vertical specimen would have the flame directed at an upward angle of 45° and a specimen at 45° would have a horizontal flame directed at it. The burner was placed at various distances from the specimens to achieve temperatures in the range of about 600° F. to 1800° F. just above the specimen surfaces. Times of heating with the torch varied from about 15 seconds to 5 minutes. In all comparative cases, the conditions employed in evaluating the coated and uncoated specimens of a set were identical except for time of exposure. For single specimens containing a coated and uncoated portion, the flame was directed so as to be centered about the division of the two portions.

For the specimens based on No. 30 asphalt felt an exposure of torch flame to the uncoated asphalt felt caused ignition within 15 seconds and flames continued after removal of the torch until the entire specimen was consumed by flames, leaving a twisted brittle residue. During the combustion, flaming ribbons of molten material ran downward from the flaming specimen and copious amounts of sooty smoke evolved. Incontrast, similar torch flame exposure of the coated felt for periods of 2 minutes and longer resulted in the generation of only a very small amount of smoke, no spreading or combustion, and flames ceased when the torch was removed. Examination of the specimen showed a hard coating to have formed at the area of torch heating, with the deterioration of the felt confined to this area.

For the single felt specimens containing vertical coated and uncoated areas, similar results were obtained. Once energetic burning of the uncoated portion had begun, usually in about 15 seconds, the torch was removed and the smoky flame spread to the entire uncoated portion of the specimen and burned until it had no significant integrity. A hard material formed from the coating along the vertical border with the flame consumed uncoated portion, and no damage was evident except at the edge which was exposed to the flames.

Similar results were obtained with tests of the divided coated/uncoated Elk Roofing Products asphalt shingles, although torch ignition time of the uncoated portion was slightly longer at 15 to 30 seconds. This is believed due to the greater mass of the Elk shingles and the covering of mineral granules on the Elk shingle surfaces. The areal density of the Elk asphalt shingle was about 5 times that of the No. 30 asphalt felt. After ignition of the uncoated portion of the asphalt shingle and removal of the torch, quantities of the flaming granule-containing surface sloughed downward spreading ignition and the flames spread to the other areas of the uncoated portion. Very large amounts of sooty smoke evolved. As with the coated felt, a hard crust formed at the coated shingle edge next to the burned area, but flames did not spread. Localized torch heating of the coated area only for periods of up to 5 minutes at temperatures of about 1300° F. or more did not cause a spread of flaming, whereas a similar heating of uncoated shingle areas for a fraction of a minute caused wide spreading of flames.

These trials demonstrate the high degree of effectiveness of the coating of Table IV on asphalt felts and shingles in preventing a spreading of combustion on exposure to exterior flames.

Although various forms and modifications have been described above, it will be appreciated that the invention is not limited thereto but encompasses all variations within the scope of the appended claims.

What is claimed is:

1. A water based roofing material coating system for fire protection comprising:
    (a) a latex including an extensible halogenated polymer and at least 1.05 times by weight of the latex polymer solids of two differentially thermally responsive solid constituents which evolve insulating gases when heated over a complementary temperature range;
    (b) bulking inert particulates of a median particle size of 110 microns or more, the bulking particulates being at least equal in weight to the latex polymer solids, to increase the coating temperature resistance, insulation capability and resistance to surface abrasion, and to provide an irregular surface finish on the coating as dried;
    (c) the entire coating being highly adherent to the roofing material but not significantly penetrating, and having a tensile strength of 200 pounds per square inch or more and an elongaton of 13 percent or more when dried;
    (d) the dried coating being water resistant with an areal density of 0.1 to 0.3 pounds per square foot or 0.009 to 0.027 inches thickness, such that the roofing material is rigidified and strengthened, and sealed against water penetration; and
    (e) the entire dried coating being self-fire extinguishing when exposed to an ignition source and yielding a residue as an integral body of 50 percent by weight or more when exposed to flames and temperatures of 1800° F. so as to decompose susceptible coating constituents.

2. A water based roofing material coating system for fire protection comprising:
    (a) a latex including an extensible halogenated polymer and at least two differentially thermally responsive solid constituents which evolve insulating gases when heated over a complementary temperature range;
    (b) bulking insert particles of a median particle size of 110 microns or more to increase the coating temperature resistance, insulation capability and resistance to surface abrasion, and to provide an irregular surface finish on the coating as dried, the bulking insert particulate fillers comprising a first filler having a median particle size of 350 microns or more and comprising about a third of the weight of the dried coating and second filler in the form of an expanded particulate having about 3 percent by weight and about 15 percent by volume of the dried coating, the expanded particulate having a median particle size of 110 microns protected from mechanism damage by the larger first filler.

3. A coating system as set forth in claim 2 above, wherein the first filler is silica sand and the second filler is perlite.

4. A coating system as set forth in claim 1 above and wherein the combustible roofing materials are absorptive of aqueous solutions, such as wooden roofing materials, and wherein the system further includes a preimpregnating solution comprising an aqueous solution of a fire retardant and fire afterglow suppressant at a dry average areal density of 0.015 to 0.025 pounds per square foot at least in the region of penetrating edges and between overlapping areas of the roof.

5. A coating system as set forth in claim 4 above, wherein the retardant and suppressant comprises an ammonium phosphate.

6. A coating system as set forth in claim 1 above which comprises:
    (a) an aqueous latex of a film forming polymer system containing at least 40 percent by weight of chlorine, said polymer system when dried being flexible and having a maximum glass transition temperature below 10° C. and an elongation greater than 200 percent;
    (b) powdered antimony trioxide in an amount of 5 to 10 parts by weight based on 100 parts by weight of the polymer system;
    (c) powdered alumina trihydrate in an amount of 45 to 135 parts by weight of the polymer system;
    (d) powdered calcium carbonate in an amount of 55 to 165 parts by weight of the polymer system and 10 to 20 parts by weight of an expanded perlite powders;
    (e) fine silica sand in an amount of 100 to 200 parts by weight of the polymer system and 10 to 20 parts by weight of an expanded perlite powder;
    (f) formulation agents each comprising less than 3 parts by weight based on 100 parts by weight of the polymer system of: coloring pigments, thickening agents to mitigate settling of dispersed solids, an emulsion stabilizing salt and a surfactant to aid in particle wetting and emulsion stabilization, inorganic water soluble bases for pH control, an antimicrobial, a defoaming agent, a polymer-filler coupling agent; and
    (g) water in addition to that present in the latex and other formulation ingredients in an amount to obtain a solids weight content of the formulation 60 to 80 percent solids by weight.

7. A coating system for application to combustible substrates to provide a substantial degree of fire resistance comprising:
    (a) an aqueous latex of a film forming polymer system containing at least 40% by weight of chlorine; said polymer system when dried being flexible and having a maximum glass transition temperature below 10° C. and an elongation greater than 200%;
    (b) powdered antimony trioxide in an amount of 5 to 10 parts by weight based on 100 parts by weight of the polymer system;
    (c) powdered alumina trihydrate in an amount of 45 to 135 parts by weight of the polymer system;
    (d) powdered calcium carbonate in an amount of 55 to 165 parts by weight of the polymer system;
    (e) formulation agents each comprising less than 3 parts by weight based on 100 parts by weight of the polymer system of: coloring pigments, thickening agents to mitigate settling of dispersed solids, an emulsion stabilizing salt and a surfactant to aid in particle wetting and emulsion stabilization, inorganic water soluble bases for pH control, an antimicrobial, a defoaming agent, a polymer-filler coupling agent; and (f) water in addition to that present in the latex and other formulation ingredients in an amount to obtain a solids weight content of the formulation 60 to 80 percent solids by weight.

8. A coating system as set forth in claim 7 above, including in addition fine silica sand in an amount of 100 to 200 parts by weight of the polymer system.

9. A coating system as set forth in claim 7 above, including in addition fine silica sand in an amount of 150 parts by weight of the polymer system and 15 parts by weight of an expanded perlite powder.

10. The coating system of claim 8, wherein the polymer system is a vinylidine chloride-acrylic copolymer, the hydrated alumina is about 91 parts by weight, the calcium carbonate is about 109 parts by weight, the antimony trioxide is about 7.5 parts by weight and the silica sand is about 150 parts by weight, all based on 100 parts by weight of the polymer system.

* * * * *